(12) United States Patent
Miyazoe et al.

(10) Patent No.: US 7,316,244 B2
(45) Date of Patent: Jan. 8, 2008

(54) SOLENOID VALVE WITH MANUAL BUTTONS

(75) Inventors: Shinji Miyazoe, Tsukuba-gun (JP); Katsuyuki Senba, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 396 days.

(21) Appl. No.: 11/054,382

(22) Filed: Feb. 10, 2005

(65) Prior Publication Data

US 2005/0236053 A1 Oct. 27, 2005

(30) Foreign Application Priority Data

Apr. 22, 2004 (JP) .............................. 2004-127129

(51) Int. Cl.
*F15B 13/043* (2006.01)
(52) U.S. Cl. ................. 137/625.64; 137/383; 137/271; 137/884
(58) Field of Classification Search ........... 137/625.64, 137/269, 271, 884, 383; 251/26, 129.03, 251/89.5, 90
See application file for complete search history.

(56) References Cited

U.S. PATENT DOCUMENTS

| 2,861,592 | A | * | 11/1958 | Collins | .................. | 137/625.64 |
|---|---|---|---|---|---|---|
| 5,437,306 | A | * | 8/1995 | Asou et al. | ............. | 137/625.64 |
| 5,529,088 | A | * | 6/1996 | Asou | ........................... | 137/884 |
| 5,558,126 | A | * | 9/1996 | Hayashi et al. | ........ | 137/625.64 |
| 5,597,015 | A | * | 1/1997 | Asou et al. | ............. | 137/625.64 |
| 5,699,834 | A | * | 12/1997 | Hayashi et al. | ............. | 137/884 |
| 5,725,255 | A | * | 3/1998 | Hayashi et al. | ........ | 137/625.64 |
| 5,775,374 | A | * | 7/1998 | Doi et al. | .............. | 137/625.64 |
| 6,155,287 | A | * | 12/2000 | Matarai et al. | ............. | 137/884 |
| 6,216,725 | B1 | * | 4/2001 | Matarai et al. | ................ | 251/90 |

FOREIGN PATENT DOCUMENTS

| DE | 31 34 756 A1 | 3/1983 |
|---|---|---|
| DE | 103 25 788 A1 | 1/2004 |
| DE | 600 07 709 T2 | 10/2004 |
| JP | 10-47509 | 2/1998 |
| JP | 10047509 A | 2/1998 |
| WO | WO 03/104696 A1 | 12/2003 |

\* cited by examiner

*Primary Examiner*—John Rivell
(74) *Attorney, Agent, or Firm*—Oblon, Spivak, McClelland, Maier & Neustadt, P.C.

(57) ABSTRACT

A solenoid valve includes a main valve unit including a spool for switching a channel, and a solenoid operating unit for driving the spool, the main valve unit includes manual buttons capable of manually switching the spool, and a safety member movably disposed, and this safety member can be moved between a locking position for locking the manual buttons in an inoperative state by locking the safety member in the manual buttons and an unlocking position for unlocking the lock by disengaging the safety member from the manual buttons.

13 Claims, 10 Drawing Sheets

SOLENOID VALVE WITH MANUAL BUTTONS

TECHNICAL FIELD

The present invention relates to a solenoid valve with manual buttons comprising manual buttons for manually switching a spool.

PRIOR ART

Solenoid valves with manual buttons for manually switching a spool have been conventionally known, as disclosed in Patent Document No. 1. This type of solenoid valves have a configuration wherein, upon an operator operating the manual button when a solenoid operating unit is not turned on, the same switching state as the case in which the operating unit is turned on is reproduced, and then the spool is switched in accordance with the switching state; normally the manual buttons are disposed on the top face of a housing or the like, and are depressed by the operator.

However, the manual buttons are exposed on the outer face of the housing, and accordingly, they are always exposed to risk such as erroneous operations by the operator or improper operations due to unintentional contact of a tool and so forth. Accordingly, some kind of safety countermeasures for preventing the aforementioned erroneous operations and improper operations, and so forth have been demanded.

Patent Document 1: Japanese Publication of Patent Application No. 10-47509

DISCLOSURE OF THE INVENTION

Accordingly, with a solenoid valve with manual buttons for manually switching a spool, it is an object of the present invention to prevent erroneous operations, improper operations, and so forth of the manual buttons, in a sure manner, by attaching a simple safety mechanism to the solenoid valve.

In order to achieve the aforementioned object, a solenoid valve with manual buttons according to the present invention comprises: a main valve unit building in a spool for switching a channel; and a solenoid operating unit for driving the spool; wherein the main valve unit includes manual buttons manually capable of switching the spool, and a safety member movably disposed, and this safety member is manually capable of moving between a locking position for locking the manual buttons in an inoperable state by locking the safety member in the manual buttons and an unlocking position for unlocking the manual buttons by releasing the safety member from the manual buttons.

In a specific example of the present invention, the manual buttons, which are made up of a short columnar member, are disposed on the top face of a housing of the main valve unit so as to be depressed in the direction orthogonal to the axial line of the main valve unit, and a part thereof includes locking grooves, and also the safety member is disposed on the top face of the housing so as to be moved in the axial direction of the main valve unit, and includes a head for operations, and a locking wall extending to the manual buttons from the head and engaging/disengaging with/from the locking grooves.

An arrangement is preferably made wherein recessed portions are formed on the tip of the locking wall in the safety member, and these recessed portions are configured so as to be fitted/locked in the manual buttons at the position of the locking grooves when the safety member is in the locking position.

Also, rail-shaped guides extending in the axial direction are formed on the top face of the housing, and the safety member is disposed so as to move along these guides.

Preferably with the present invention, the manual buttons are self-retaining-type manual buttons, which can be retained in an operating position, and are configured so as to restrict the safety member from moving to the locking position when these manual buttons are self-retained in the operating position.

According to the present invention thus configured, simply moving the safety member to the locking position prevents erroneous operations and improper operations and so forth of the manual buttons in a sure manner.

DESCRIPTION OF THE PREFERRED EMBODIMENTS

Figure 1:
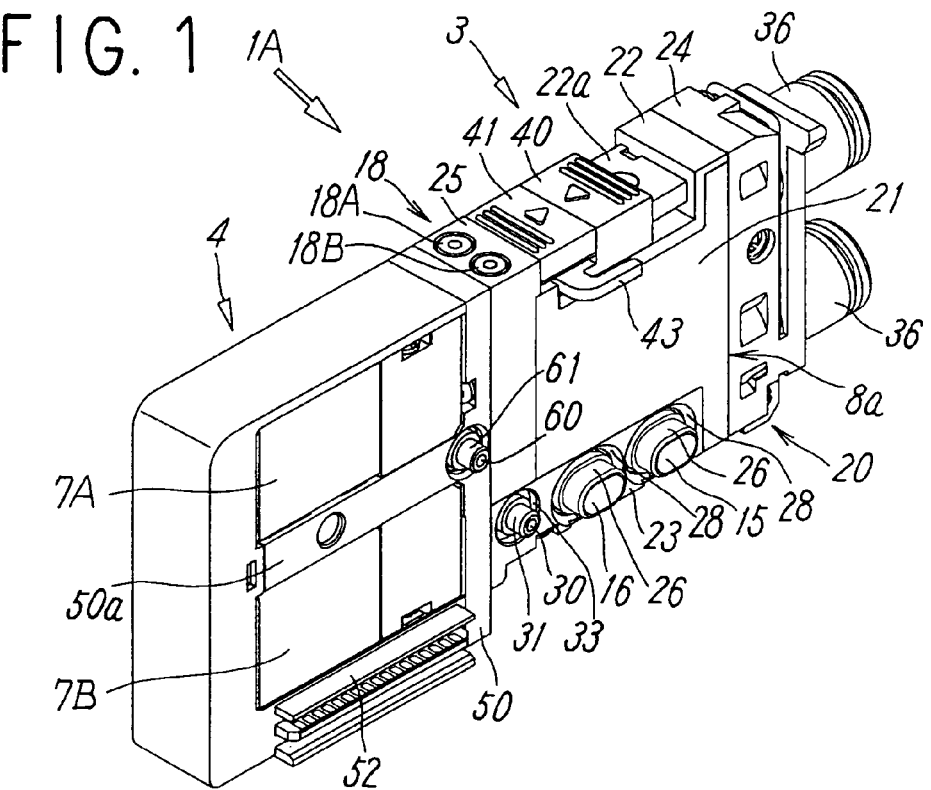
FIG. 1 is a perspective view of a solenoid valve with manual buttons according to a first embodiment of the present invention as viewed from a first coupling face side.
Figure 2:
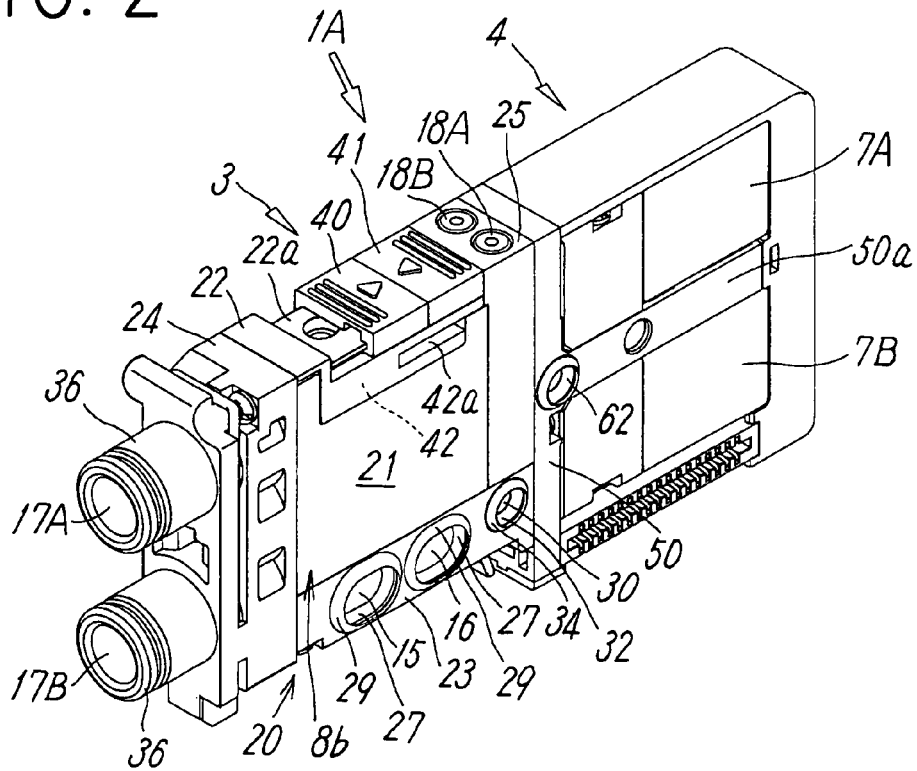
FIG. 2 is a perspective view of the solenoid valve in FIG. 1 as viewed from a second coupling face side.

FIG. 1 through FIG. 8 illustrate a solenoid valve with manual buttons according to a first embodiment of the present invention, this solenoid valve is a type to be used in an arrangement of a solenoid valve assembly in which plurality of solenoid valves are mounted in a sequentially coupled state on a rail, and includes a configuration such as shown in the following. That is to say, this solenoid valve 1A according to the first embodiment includes, as can be understood from FIG. 1 and FIG. 4, a main valve unit 3 configured so as to switch an air channel using a spool 6, and a pilot-type solenoid operating unit 4 connected to one end side of this main valve unit 3 in the axial direction (longitudinal direction), and is a double-pilot-type solenoid valve for controlling pilot air using two pilot valves 7A and 7B of this solenoid operating unit 4 to drive the spool 6. Also, both side faces of this solenoid valve 1A in the valve-width direction (horizontal-width direction) correspond to a practically flat first coupling face 8a and a practically flat second coupling face 8b for coupling another solenoid valve.

The main valve unit 3 having a 5-port-type valve configuration comprises a valve hole 10 extending in the axial direction, five air openings 11, 12A, 12B, 13A, and 13B for supply, output, and discharge, each of which mutually opens at a position different from the valve hole 10, the spool 6, which is slidably inserted in the valve hole 10, for switching a channel between these air openings, two pistons 14a and 14b, which are in contact with both ends of the spool 6 in the axial direction and are driven by pilot air supplied from the solenoid operating unit 4, for switching the spool 6, plurality of coupling communication holes 15 and 16 passing through the main valve unit 3 in the valve-width direction, two output ports 17A and 17B provided on the end face of the opposite side of the side where the solenoid operating unit 4 of the main valve unit 3 is connected, and a manual operating portion 18 including two manual buttons 18A and 18B capable of switching the spool 6.

The example illustrated in the drawings is provided with the two coupling communication holes 15 and 16, wherein one, i.e., the coupling communication hole 15 is for main air supply and the other, i.e., the coupling communication hole 16 is for main air discharge. The coupling communication hole 15 for supply is connected to the air opening 11 for supply via a branch hole 11a, and the coupling communication hole 16 for discharge is connected to the two air openings 13A and 13B for discharge via branches 13a and 13b in common. However, an arrangement may be made wherein the two coupling communication holes 16 for discharge are provided, and one is connected to the air opening 13A for discharge and the other is connected to the air opening 13B for discharge. Also, the output port 17A is connected to the air opening 12A for output via an output communication hole 12a, and the output port 17B is connected to the air opening 12B for output via an output communication hole 12b.

A housing 20 of the main valve unit 3 is divided into plurality of blocks. More specifically, the housing 20 includes a center block 21 positioned in the center of the housing 20, a top block 22 connected to the upper end portion of the center block 21, a bottom block 23 connected to the lower end portion of the center block 21, an output block 24 connected to a first end side of the center block 21 in the axial direction (longitudinal direction), and a manual block 25 connected to a second end side serving as the opposite side of the center block 21, and is formed by these blocks having a rectangular cross-sectional shape so as to assume a generally rectangular longitudinal cross-sectional shape as a whole.

The center block 21 includes end walls 21a and 21b vertically extending in the first end side of the axial direction, the bottom block 23 is disposed at the bottom side of the center block 21 in a state in which the bottom block 23 is positioned in the axial direction by one end of the bottom block 23 being in contact with the lower end wall 21b, and is fixed to the center block 21 with a screw 23a. The end wall 21b and the bottom block 23 are formed with essentially the same height, and accordingly, the bottom end faces of these make up a single face. The valve hole 10 extending in the axial direction is formed within the center block 21, and the coupling communication holes 15 and 16 are formed within the bottom block 23. Each of the coupling communication holes 15 and 16 includes a connection tube 26 protruding on the first coupling face 8a side, and a circular seal member 27 applied within the communication hole on the second coupling face 8b side, and in the event that the plurality of solenoid valves 1A are coupled, the corresponding coupling communication holes 15 and the corresponding coupling communication holes 16 are connected in an airtight manner respectively by mutually fitting the connection tube 26 and seal member 27 of the adjacent solenoid valves.

A pilot supply communication hole 30 passing through in the valve-width direction is further formed within the bottom block 23, and this pilot supply communication hole 30 communicates with the two pilot valves 7A and 7B of the solenoid operating unit 4 and the manual operating portion 18 via a pilot branch hole omitted in the drawings. This pilot supply communication hole 30 includes a connection tube 31 protruding on the first coupling face 8a side, and a circular seal member 32 applied within the communication hole on the second coupling face 8b side, and in the event that the plurality of solenoid valves 1A are coupled, the corresponding pilot supply communication holes 30 are connected in an airtight manner by mutually fitting the connection tube 31 and seal member 32 of the adjacent solenoid valves, in the same way as the case of the coupling communication holes 15 and 16.

Note that the connection tubes 26 and 31 may be formed separately from the bottom block 23, and attached within the coupling communication holes 15 and 16 and the pilot supply communication hole 30, but in the event that the bottom block 23 is made up of a synthetic resin, these may be formed integrally with this bottom block 23.

Thus, the housing 20 is divided into plurality of blocks, the valve hole 10 is provided within the center block 21, and the coupling communication holes 15 and 16 and the pilot supply communication hole 30 are formed within the bottom block 23, thereby facilitating manufacturing of these respective communication holes, manufacturing of channels connecting between the respective coupling communication holes 15 and 16 and the valve hole 10, manufacturing of plurality of branch holes connecting between the pilot supply communication hole 30 and the pilot valves 7A and 7B, and so forth. In addition, the connection tubes 26 and 31 and the seal members 27 and 32 are provided on both sides of the respective coupling communication holes 15 and 16 and the pilot supply communication hole 30, and the connection tube and seal member of the adjacent solenoid valves are mutually fitted, thereby improving airtightness at the time of connecting the coupling communication holes 15, the coupling communication holes 16, or the pilot supply communication holes 30.

With the output block 24 and the manual block 25 in each of which a piston chamber is formed, the piston chamber of the output block 24 accommodates the piston 14a, and the piston chamber of the manual block 25 accommodates the piston 14b. Also, a pilot pressure chamber 35a is provided on the back face of the piston 14a, and a pilot pressure chamber 35b is provided on the back face of the piston 14b, and these pilot pressure chambers 35a and 35b communicate with the pilot valves 7A and 7B and the pilot supply communication hole 30, which are the corresponding one side thereof, by means of individual pilot output channels omitted in the entire drawing via the manual buttons 18A and 18B, which are the corresponding other side thereof respectively. In the example illustrated in the drawing, the diameters of the two pistons 14a and 14b are different in size, i.e., the diameter of the first piton 14a is greater than the diameter of the second piston 14b, but an arrangement may be made wherein these are the same in size.

Figure 3:
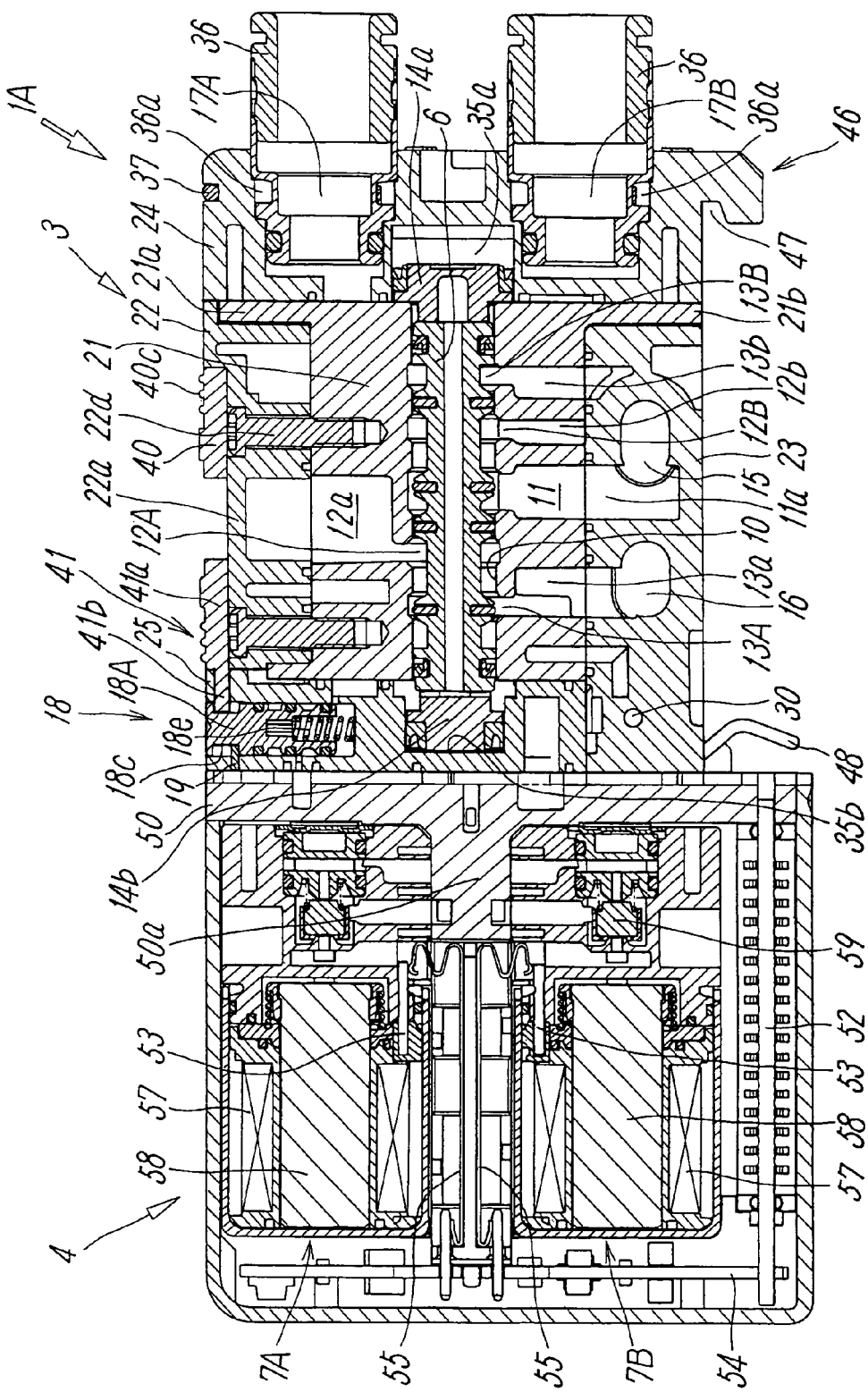
FIG. 3 is a cross-sectional view of the solenoid valve in FIG. 1.
Figure 4:
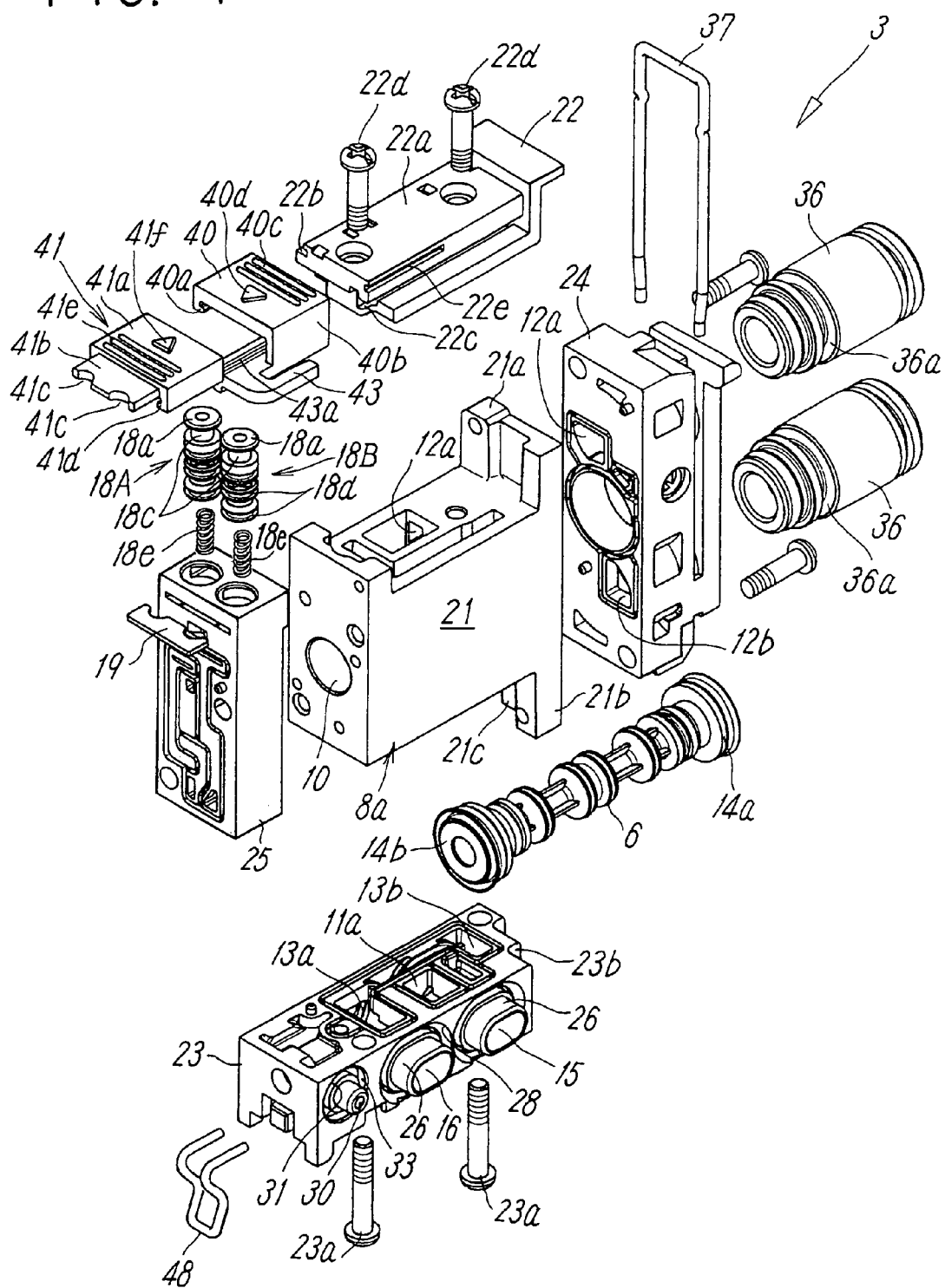
FIG. 4 is a perspective view illustrating a disassembled main valve unit of the solenoid valve in FIG. 1.

Upon the first pilot valve 7A on one side being activated so as to supply pilot air to the first pilot pressure chamber 35a, the spool 6 moves to the first switching position in FIG. 3 due to actions of the first piston 14a, the air opening 11 for supply communicates with the second air opening 12B for output so as to abstract air output from the second output port 17B, and also the first air opening 12A for output communicates with the first air opening 13A for discharge so as to place the first output port 17A in a ventilating state. Conversely, upon the second pilot valve 7B on the other side being activated so as to supply pilot air to the second pilot pressure chamber 35b, the spool 6 moves to the position opposite from the first switching position in FIG. 3 due to actions of the second piston 14b, the air opening 11 for supply communicates with the first air opening 12A for output so as to abstract air output from the first output port 17A, and also the second air opening 12B for output communicates with the second air opening 13B for discharge so as to place the second output port 17B in a ventilating state.

A quick-connection-type tube joint 36, which can connect a piping tube in a state safe from falling out simply by inserting the tube thereto, is attached to the output ports 17A and 17B formed within the output block 24 respectively. This tube joint 36 having a locking groove 36a on the perimeter thereof is attached to the output ports 17A and 17B respectively so as to prevent the connection tube from dropping off by locking this locking groove 36a with a U-shaped clip 37 mounted in the output block 24.

The manual operating portion 18 is for reproducing a switching state with the pilot valves 7A and 7B by means of manual operations, and includes the two manual buttons 18A and 18B disposed in array on the top face of the manual block 25 in the valve-width direction. These manual buttons are made up of a short columnar member, include plurality of seal members 18d for switching a pilot channel on the perimeter thereof, and also include locking grooves 18c formed close to the upper end portion in the circumferential direction, and are disposed so as to be depressed toward the direction orthogonal to the axial line of the main valve unit 3 from the top face of the manual block 25 (downward in the drawing). The first manual button 18A corresponds to the first pilot valve 7A, and the second manual button 18B corresponds to the second pilot valve 7B, and upon the first manual button 18A being depressed, the pilot supply communication hole 30 directly communicates with the first pilot pressure chamber 35a through a pilot output channel without passing through the first pilot valve 7A, on the other hand, upon the second manual button 18B being depressed to the position where a head portion 18a is locked in a positioning plate 19, the pilot supply communication hole 30 directly communicates with the second pilot pressure chamber 35b through a pilot output channel without passing through the second pilot valve 7B.

The locking grooves 18c may be formed around the entire circumference of the manual buttons 18A and 18B, or may be formed around only a part of the circumference.

The respective manual buttons 18A and 18B are always pressed toward a rising position, that is an inoperative position side due to the spring force of a return spring 18e, and normally occupy this inoperative position. Accordingly, following the operator depressing the manual button, upon the operator stopping depression of the manual button, the manual button is automatically returned to the inoperative position due to the spring force of the return spring 18e.

The top block 22 is disposed within a recessed stage portion 21d between the end wall 21a of the first end side and the end wall 21c of the second end side on the top face of the center block 21, and fixed to the center block 21 with a screw 22d. This top block 22 is a slender member in the axial direction having essentially the same horizontal width as the center block 21, and a flat rail-shaped guide 22a extending in the axial direction of the main valve unit 3 is formed on the top face thereof. A binding member 40 and safety member 41, which are adjacent to each other, are assembled on the guide 22a so as to move along the guide 22a, and can be operated from the top face of the solenoid valve 1A independently. As can be understood from FIG. 2 and FIG. 5, a hook-engaging portion 42 extending in the axial direction of the main valve unit 3 is provided on a somewhat lower position than the guide 22a on the side face of the second coupling face 8b side of the top block 22, and a hook insertion opening 42a is opened on the second coupling face 8b adjacent to the engaging portion 42.

The binding member 40 serving as a groove-shaped member is mounted on the guide 22a so as to overstride the guide 22a, and a locking protrusion 40a and a hook supporting wall 43a, which are formed inward as to the side face of the binding member 40, are engaged with locking grooves 22b and 22c of both side faces of the guide 22a. A side wall portion 40b extending downward is formed on one side face of the binding member 40, i.e., on the side face of the first coupling face 8a side, and a hook 43 for engaging is integrally formed on the lower end portion of the side wall portion 40b via the hook supporting wall 43a. This hook supporting wall 43a is formed so as to extend in the horizontal direction toward the inner side of the binding member 40 in the width direction, on the lower end portion of the side wall portion 40b, and also so as to extend to the safety member 41 side with one end thereof, the hook 43 is formed so as to protrude toward outside the side face of the housing 20 once on the end portion of the hook supporting wall 43a extending to the safety member 41 side, and then extend in the axial direction of the housing 20 along the side wall portion 40b. This hook 43 is for engaging with the engaging portion 42 of the adjacent solenoid valve at the time of coupling plurality of solenoid valves 1A.

Figure 5:
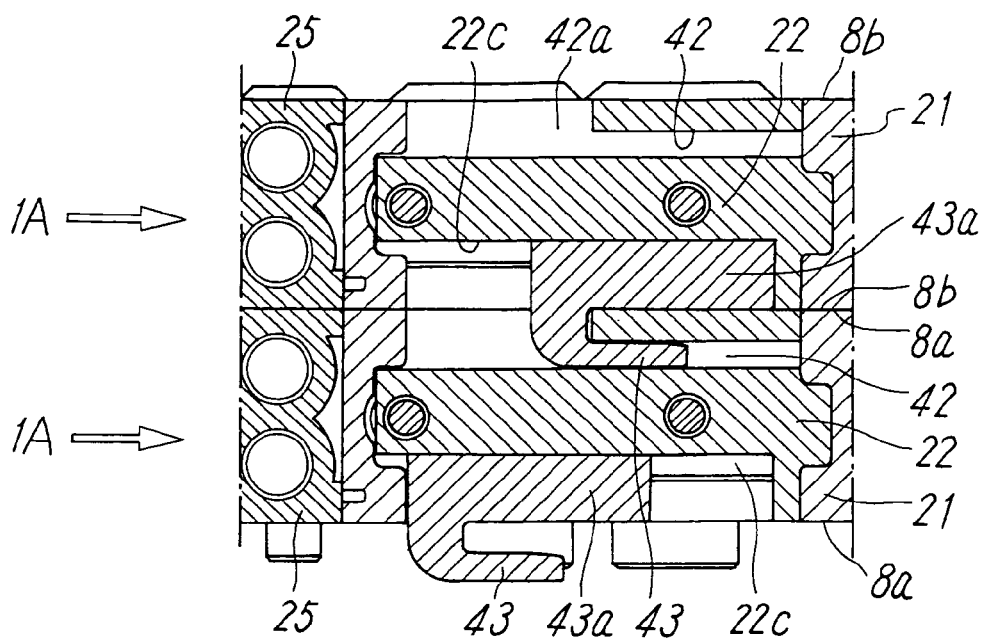
FIG. 5 is a cross-sectional view of the principal components in a state in which two adjacent solenoid valves are coupled.

The binding member 40 is configured so as to control the hook 43 to move between the binding position to be engaged with the engaging portion 42 of the adjacent solenoid valve (solenoid valve 1A illustrated at the upper side in FIG. 5) and the separating position to be disengaged from this engaging portion 42 (solenoid valve 1A illustrated at the lower side in FIG. 5). A plurality of protrusions 40c for preventing the finger from slipping at the time of operations, and an arrow 40d indicating the operating direction toward the separating position are provided on the top face of the binding member 40.

The safety member 41 includes a head 41a for operations, and a locking wall 41b extending from this head 41a. The head 41a serving as a groove-shaped member is mounted on the guide 22a so as to overstride the guide 22a, and a locking protrusion 41d, which is formed inward as to both side faces of the safety member 41, is engaged with locking grooves 22b and 22e of both side faces of the guide 22a. Similarly, a plurality of protrusions 41e for preventing the finger from slipping at the time of operations, and an arrow 41f indicating the operating direction, are provided on the top face of this head 41a.

Also, the lock wall 41b is a flat plate portion extending from one end of the head 41a to the manual buttons 18A and 18B in the horizontal direction, and the tip thereof reaches the inner portion of the manual block 25. Two crescent-shaped recessed portions 41c and 41c are formed on the tip of this locking wall 41b, and these recessed portions 41c and 41c are configured so as to be fitted or locked in the two manual buttons 18A and 18B at the position of the locking grooves 18c. As illustrated in FIG. 3, when this locking wall 41b is locked in the locking grooves 18c, the manual buttons 18A and 18B are locked in the inoperative position, and are prevented from depressing operations.

Figure 6:
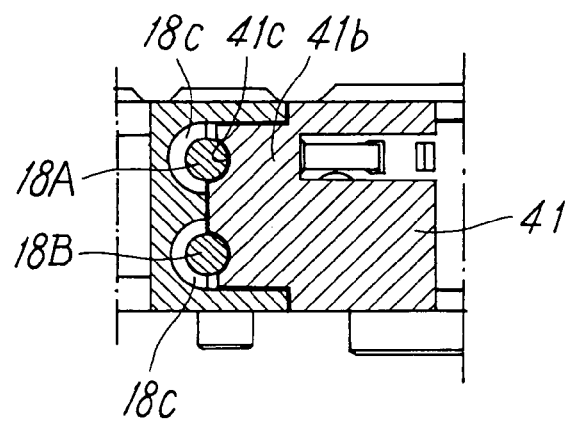
FIG. 6 is a cross-sectional view of the principal components in a state in which a safety member locks manual buttons.
Figure 7:
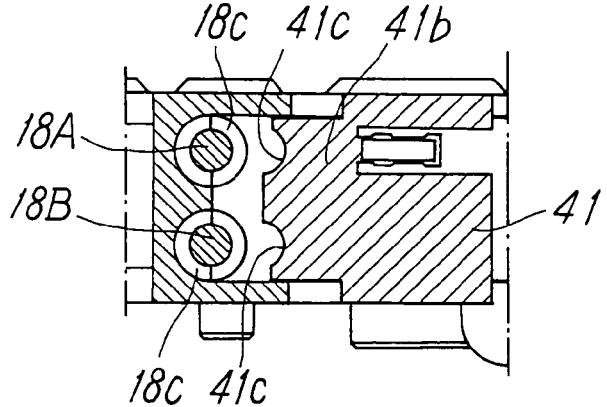
FIG. 7 is a cross-sectional view of the principal components in a state in which the safety member moves toward a position where the locked manual buttons are released.

This safety member 41 is disposed on the position adjacent to the binding member 40, and, in the event that this binding member 40 is positioned on the separating position as illustrated in FIG. 1 and FIG. 6, the two recessed portions 41c and 41c of the tip of the locking wall 41b are pressed by the binding member 40 so as to move to the position for locking the locking grooves 18c of the two manual buttons 18A and 18B in an inoperable state. On the other hand, in the event that the binding member 40 is positioned on the binding position as illustrated in FIG. 3, the safety member 41 is released from the binding member 40, and the locking wall 41b is capable of disengaging from the manual buttons 18A and 18B so as to move to the position for releasing the locked state as illustrated in FIG. 7. Accordingly, the binding member 40 also includes a function as a fixing member for fixing the safety member 41 to the locking position.

Now, operations for moving the safety member 41 are allowed only when both the manual buttons 18A and 18B are in the inoperative position, and when one of or both the manual buttons are depressed in the operating position, the safety member 41 cannot be moved to the locking position since the locking grooves 18c cannot be engaged with the locking wall 41b by the locking grooves 18c moving downward and vertically deviating from the position of the locking wall 41b.

Figure 8:
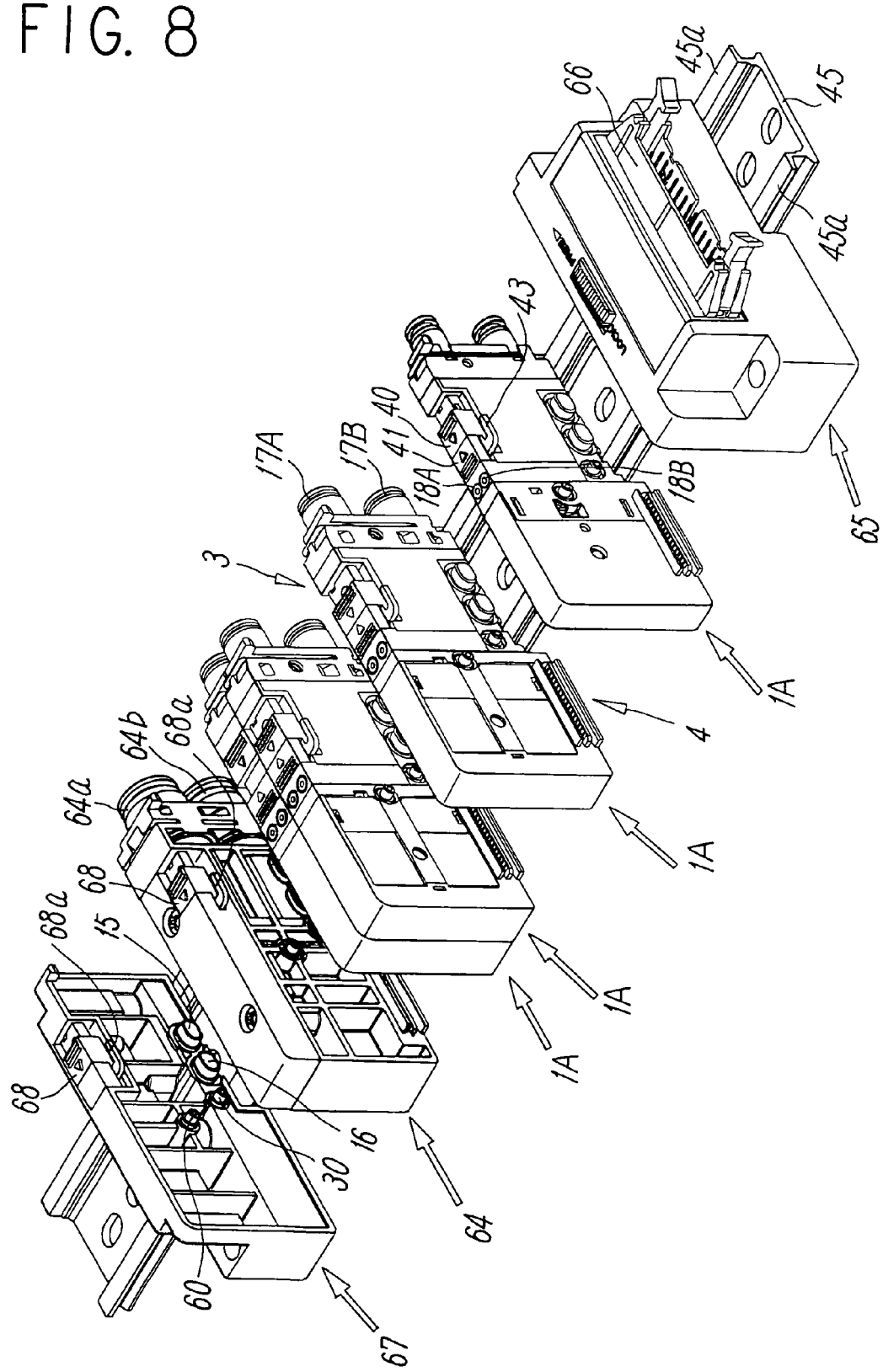
FIG. 8 is a perspective view illustrating a process on the way to formation of solenoid valve assembly by mounting the solenoid valve in FIG. 1 on a rail.

A recessed rail attachment portion 46 capable of fitting to a rail 45 is formed on the bottom face of the main valve unit 3. This rail attachment portion 46 includes an attachment groove 47 formed on the lower end portion of the output block 24, and a rail clip 48 provided on the lower end portion of the bottom block 23, and these attachment groove 47 and rail clip 48 are retained by flange portions 45a on both side ends of the rail 45, thereby mounting the solenoid valve 1A on the rail 45, as illustrated in FIG. 8. Note that the rail 45 is a DIN rail.

The solenoid operating unit 4 includes the housing 20 of the main valve unit 3, i.e., an adapter block 50 coupled with the manual block 25 and the bottom block 23 with a screw. This adapter block 50 includes an intermediate base 50a extending in the horizontal direction from the intermediate position thereof, and the first pilot valve 7A and the second pilot valve 7B are attached on both the upper and lower faces of the intermediate base 50a. The adapter block 50 is attached with an electrical connector 52 for coupling having plurality of terminals, and part of the terminals of this electrical connector 52 and each coil terminal 53 of the pilot valves 7A and 7B are electrically connected via a printed board 54 and an electroconductive fitting 55.

The electrical connector 52 is configured so as to mutually electrically connect to the electrical connector of the adjacent solenoid valve at the time of coupling plurality of solenoid valves 1A, and is employed for power supply and for signal transmission.

The pilot valves 7A and 7B include exciting coils 57, a movable iron core 58 to be displaced due to magnetic force generated at the time of turning on the exciting coils 57, and a valve member 59 for opening/closing a pilot valve sheet, which is driven by the movable iron core 58. The output opening of the first pilot valve 7A communicates with the first pilot pressure chamber 35a, the output opening of the second pilot valve 7B communicates with the second pilot pressure chamber 35b, the input openings of both pilot valves 7A and 7B communicate with the pilot supply communication hole 30 in common, and the discharge openings of both pilot valves 7A and 7B communicate with a pilot discharge communication hole 60 in common. When the first pilot valve 7A is turned on, pilot air from the pilot supply communication hole 30 is supplied to the first pilot pressure chamber 35a so as to drive the first piston 14a, on the other hand, when the second pilot valve 7B is turned on, pilot air from the pilot supply communication hole 30 is supplied to the second pilot pressure chamber 35b so as to drive the second piston 14b.

The configurations of the pilot valves 7A and 7B are known, and do not directly relate to the essence of the present invention; accordingly, further detailed description regarding the configurations thereof will be omitted.

The pilot discharge communication hole 60 is formed within the adapter block 50 so as to pass through the block in the valve-width direction, includes a connection tube 61 protruding on the first coupling face 8a side, and a circular seal member 62 applied within the communication hole on the second coupling face 8b side in the same way as with the pilot supply communication hole 30, and when plurality of solenoid valves 1A are coupled, the pilot discharge communication holes 60 are connected in an airtight manner by the connection tube 61 and seal member 62 of the adjacent solenoid valves mutually fitting.

Also, in this case, an arrangement may be made wherein only one recessed portion corresponding to the first manual button 18A is formed on the tip of the locking wall 41b of the safety member 41, and the depth of the recessed portion corresponding to the second manual button 18B is sufficiently secured, thereby preventing the second manual button 18B from becoming an obstacle at the time of moving the safety member 41 to the locking position. Alternatively, the half portion of the second manual button 18B side of the locking wall 41b may be cut off.

In the event that a solenoid valve assembly is configured of the coupling solenoid valve 1A having the aforementioned configuration, as illustrated in FIG. 8, the plurality of solenoid valves 1A, a port block 64 including an air supply port 64a and discharge port 64b for connection in bulk, a connector block 65 including a connection connector 66 for power supply in bulk, and an end block 67 positioned outside of the port block 64 are arrayed on the rail 45 such as shown in the drawing, and are sequentially coupled so as to be fixed on the rail 45. In FIG. 8, a state in which only a part of the solenoid valves 1A are mutually coupled, and connected with the hook 43 is illustrated, but all of the solenoid valves 1A and the aforementioned respective blocks 64, 65, and 67 are sequentially coupled, and mutually connected with the hook in the same way.

Therefore, the port block 64 positioned in the middle includes a movable binding member 68 having the same configuration as that provided in the solenoid valve 1A, a hook 68a, which is formed under the binding member 68, protruding on the first coupling face side (right side in FIG. 8), and an engaging portion positioned on the second coupling face side (left side in FIG. 8), the end block 67 includes the movable binding member 68, the hook 68a, which is formed under the binding member 68, protruding on the first coupling face side, and the connector block 65 includes an engaging portion positioned on the second coupling face side. The hook 68a of the end block 67 is engaged with the engaging portion of the port block 64, the hook 68a of the port block 64 is engaged with the engaging portion 42 of the solenoid valve 1A positioned on one end of the solenoid valve array, and the hook 43 of the solenoid valve 1A positioned on the other end of the solenoid valve array is engaged with the engaging portion of the connector block.

Also, the plurality of coupling communication holes 15 and 16, the pilot supply communication hole 30, and the pilot discharge communication hole 60 are formed in the aforementioned respective blocks 64, 65, and 67, in the same way as the solenoid valve 1A, and the corresponding communication holes are mutually connected, but while the aforementioned respective communication holes in the case of the port block 64 are formed so as to pass through the port block 64, the end portions of the respective communication holes in the case of the end block 67 and the connector block 65 are sealed within each block.

Note that the respective solenoid valves 1A and the respective blocks 64, 65, and 67 are attached to the rail 45 by fixing the end block 67 and the connector block 65, which are positioned on both ends of the solenoid valve array, to the rail 45.

FIG. 9 through FIG. 13 illustrate a solenoid valve according to a second embodiment of the present invention. A solenoid vale 1B of this second embodiment includes self-retaining type manual buttons 18A and 18B, which can be locked in an operating position, and has primarily the following configuration different from the solenoid valve 1A according to the first embodiment.

That is to say, with the respective manual buttons 18A and 18B, a generally V-shaped notch 70 having a center angle of around 90 degrees is formed in the axial portions surrounded by the locking grooves 18c across the entire vertical groove width of the locking grooves 18c, and also a generally V-shaped locking hole 70a having a center angle of around 90 degrees is formed in the position adjacent to the notch 70, which is the upper end of the notch 70, so as to couple with the notch 70. The hole width in the vertical direction of this locking hole 70a is smaller than the hole width of the notch 70, i.e., around a half thereof.

Figure 9:
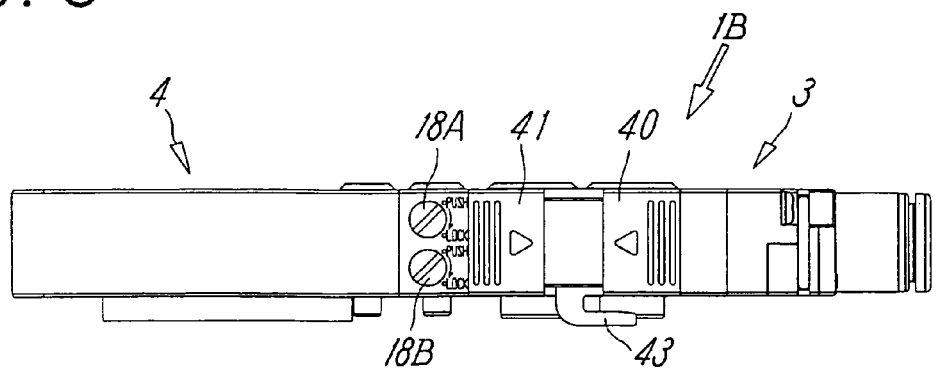
FIG. 9 is a plan view illustrating a solenoid valve according to a second embodiment of the present invention.
Figure 10:
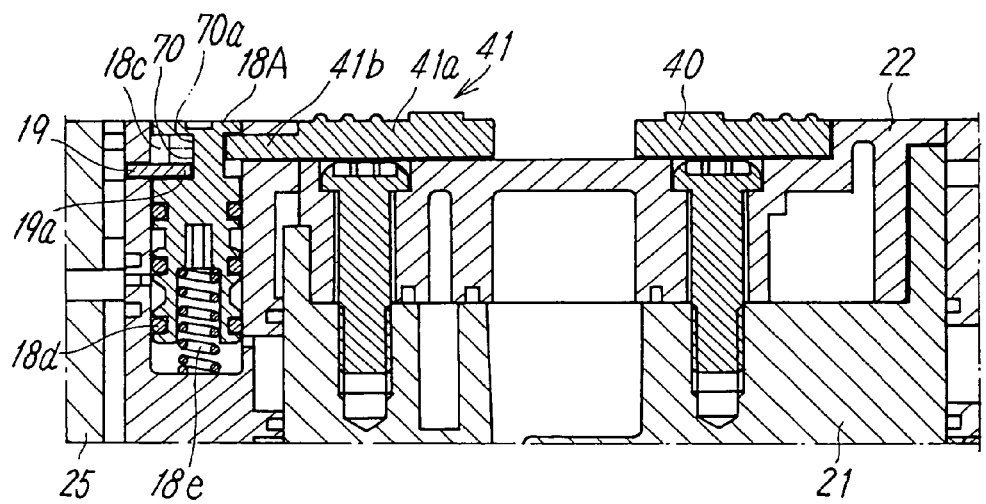
FIG. 10 is a magnified cross-sectional view of the principal component in FIG. 9, and illustrates a state in which manual buttons are in an inoperable position and are locked by a safety member.
Figure 11:
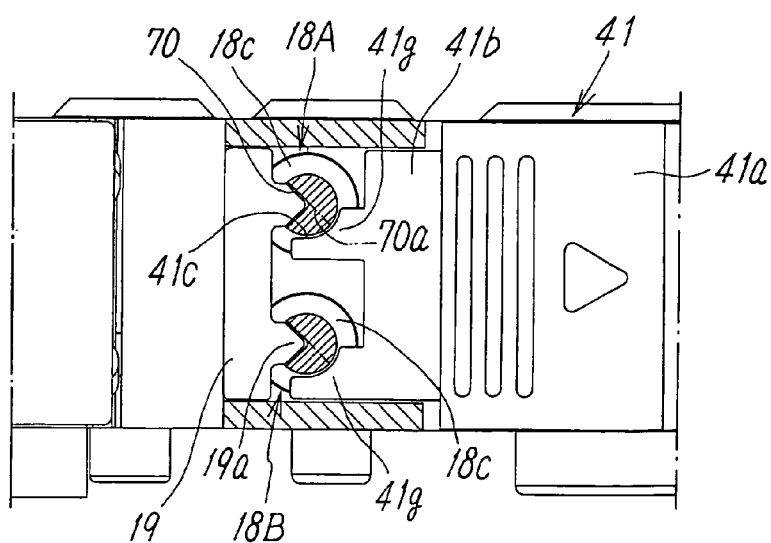
FIG. 11 is a cross-sectional view of the article shown in FIG. 10.
Figure 12:
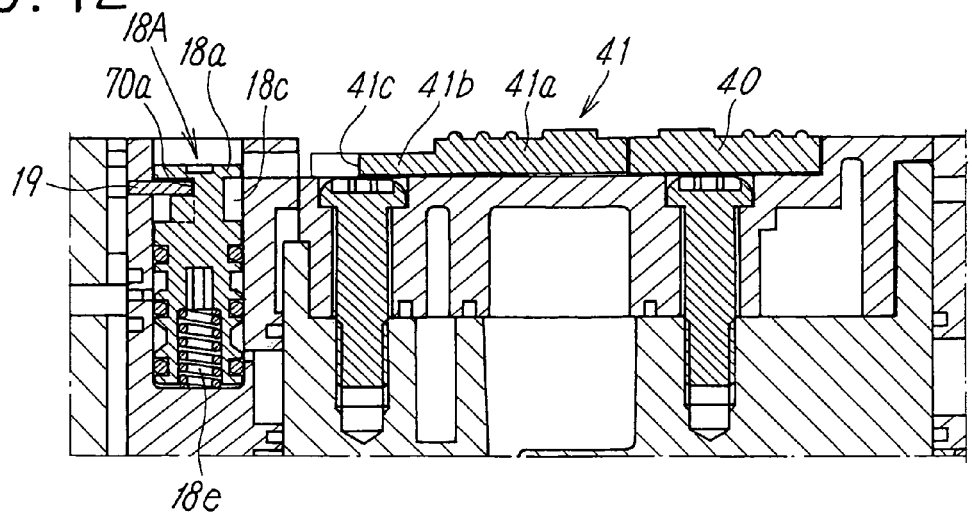
FIG. 12 is a magnified principal component cross-sectional view in FIG. 9, and illustrates a state in which the manual buttons are self-retained in an operating position.

On the other hand, on a positioning plate 19 attached to the manual block 25, a triangle-mountain-shaped protruding portion 19a is formed in the positions corresponding to the respective manual buttons 18A and 18B respectively, and this protruding portion 19a is fitted in the notch 70 so as to relatively move in the vertical direction. The thickness of this protruding portion 19a is smaller than the hole width of the locking hole 70a. As illustrated in FIG. 9 through 11, in a state in which the safety member 41 is restricted to the unlocking position for coming into contact with the binding member 40 so as to unlock the lock due to the locking wall 41b, when the manual buttons 18A and 18B in an inoperative position are depressed to the position where the head portions 18a are in contact with the positioning plate 19, and are rotated around the axial line by 90 degrees, the protruding portions 19a are fitted in the locking holes 70a, and the manual buttons 18A and 18B are self-retained in the position, i.e., the operating position. Thus, in a state in which the manual buttons 18A and 18B are self-retained in the operating position, even if the safety member 41 is advanced, the locking wall 41b comes into contact with the head portion 18a of the buttons so as not to be engaged with the locking grooves 18c, and consequently, the safety member 41 cannot be moved to the locking position as illustrated in FIG. 12 and FIG. 13.

Figure 14:
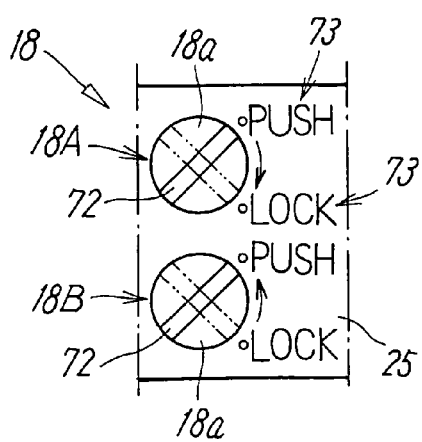
FIG. 14 is a plan view illustrating a magnified manual operating portion of that shown FIG. 9.

As can be understood from FIG. 14, an operating groove 72 for a tool being inserted and rotated is formed on the top face of the head portion 18a of the respective manual buttons 18A and 18B in the diameter direction, and this operating groove 72 also serves as a indication mark for confirming whether the respective manual buttons 18A and 18B are in the operating position or in the inoperative position. On the other hand, a display 73 indicating the direction of the operating groove 72 is provided on the top face of the manual block 25. In this example, the display 73 indicating "PUSH" and "LOCK" is provided, and when the operating groove 72 points to "PUSH", this indicates the case in which the manual buttons 18A and 18B are in the inoperative position, on the other hand, when the operating groove 72 points to "LOCK", this indicates the case in which the manual buttons 18A and 18B are self-retained in the operating position.

Figure 13:
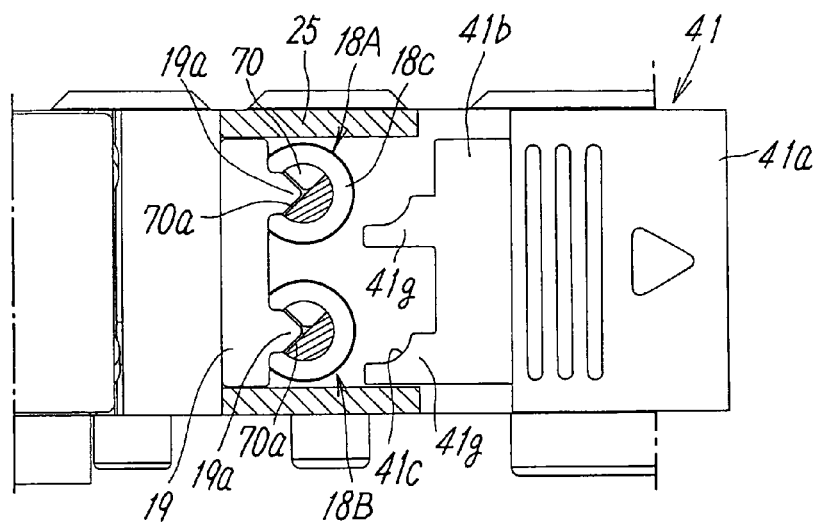
FIG. 13 is a cross-sectional view of the article shown in FIG. 12.

Also, as can be understood from FIG. 11 and FIG. 13, the locking wall 41b of the safety member 41 includes protruding wall portions 41g and 41g corresponding to the respective manual buttons 18A and 18B on the tip thereof, and the recessed portions 41c for engaging with the locking grooves 18c of the respective manual buttons 18A and 18B are formed on the tip of the protruding portion 41g.

Note that the configurations and operations of the solenoid valve 1B according to the second embodiment other than the aforementioned configuration and operation are essentially the same as those in the solenoid valve 1A according to the first embodiment, and accordingly, the same principal components are denoted with the same reference numerals as those in the first embodiment, and description thereof is omitted.

Figure 15:
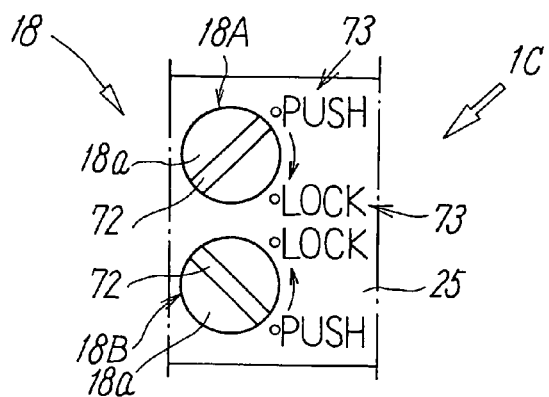
FIG. 15 is a plan view illustrating a solenoid valve according to a third embodiment of the present invention of which only a manual operating portion is magnified.

FIG. 15 illustrates a solenoid valve 1C according to a third embodiment of the present invention of which only the manual operating portion 18 is magnified, and the difference point between the third embodiment and the second embodiment is in that while the two manual buttons 18A and 18B of the solenoid valve according to the second embodiment are in the same direction both at the operating position and at the inoperative position, the two manual buttons 18A and 18B of the solenoid valve IC according to the third embodiment are in the different directions by 90 degrees between at the operating position and at the inoperative position.

Figure 16:
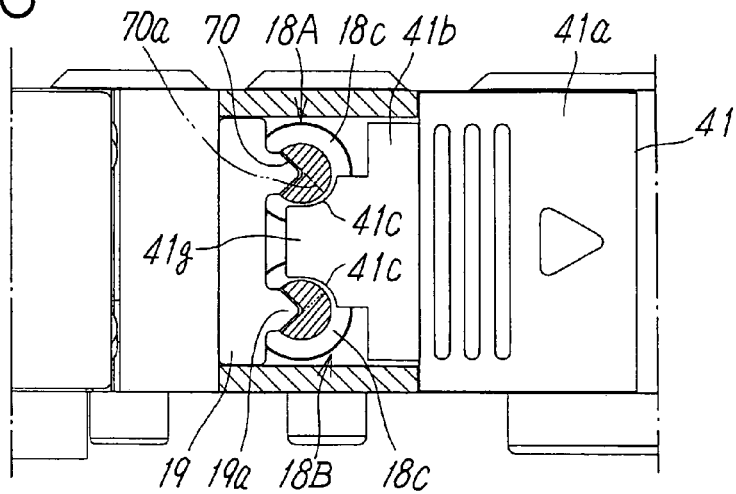
FIG. 16 is a cross-sectional view of principal components of the solenoid valve according to the third embodiment, and illustrates a state in which the manual buttons are in inoperable position, and are locked by the safety member.
Figure 17:
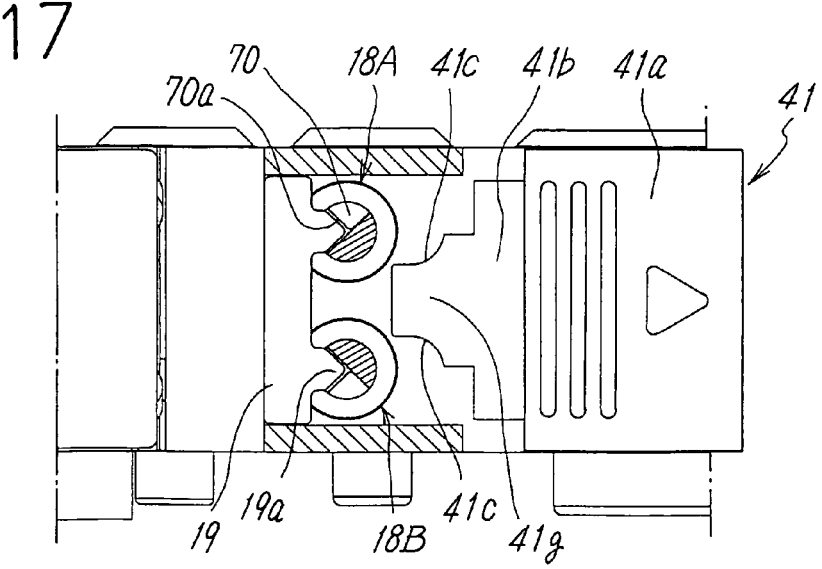
FIG. 17 is a cross-sectional view of the principal components of the solenoid valve according to the third embodiment, and illustrates a state in which the manual buttons are self-retained in an operating position.

Also, as illustrated in FIG. 16 and FIG. 17, the locking wall 41b of the safety member 41 includes a protruding wall portion 41g in the center position of the tip thereof, and the recessed portions 41c and 41c for engaging with the locking grooves 18c of the respective manual buttons 18A and 18B are formed on both sides of the tip portion of the protruding wall portion 41g.

The configurations and operations of the third embodiment other than the aforementioned configuration and operation are essentially the same as those in the second embodiment.

Note that with the second and third embodiments, when either one of the manual buttons is self-retained in the operating position, even in the case in which the other manual button is in the inoperative position, the safety member 41 cannot be moved to the locking position. However, an arrangement may be made wherein the safety member 41 is divided in the center position in the width direction into two members, i.e., the first safety member corresponding to the manual button 18A, and the second safety member corresponding to the manual button 18B, and also these two safety members may be moved independently, thus, even when one of the manual buttons is self-retained in the operating position, the other manual button positioned in the inoperative position can be locked by the corresponding safety member being moved to the locking position.

FIG. 18 through FIG. 22 illustrate a solenoid valve according to a fourth embodiment of the present invention, this solenoid valve 1D is different from the solenoid valve 1A according to the first embodiment in that this solenoid valve 1D is a single-pilot-type solenoid valve of which the solenoid operating unit 4 includes only the pilot valve 7A, and in that this solenoid valve 1D is not a type for directly coupling solenoid valves but rather a type for attaching each solenoid valve to a single-type or division-type manifold base with a screw. A brief description will be made below regarding the configuration thereof.

This solenoid valve ID is made up of the main valve unit 3 and the solenoid operating unit 4. The housing 20 of the main valve unit 3 comprises a center block 75 positioned in the center, first and second end blocks 76 and 77 bound on both ends of this center block 75, and the center block 75 includes the valve hole 10 extending in the axial direction, the five air openings 11, 12A, 12B, 13A, and 13B for supply, output, and discharge, which open in the valve hole 10, and the spool 6 inserted in the valve hole 10 so as to slide.

Also, the first end block 76 and the second end block 77 include two pistons 14a and 14b, large and small, which are in contact with both ends of the spool 6, and pilot pressure chambers 35a and 35b in the back face of these pistons 14a and 14b. The second pilot pressure chamber 35b on the small-diameter second piston 14b side always communicates with the air opening 11 for supply due to a pilot supply communication hole 79b, and the first pilot pressure chamber 35a on the large-diameter first piston 14a side communicates with the air opening 11 for supply via the manual button 18A, the pilot valve 7A, and the pilot supply communication hole 79a.

Figure 18:
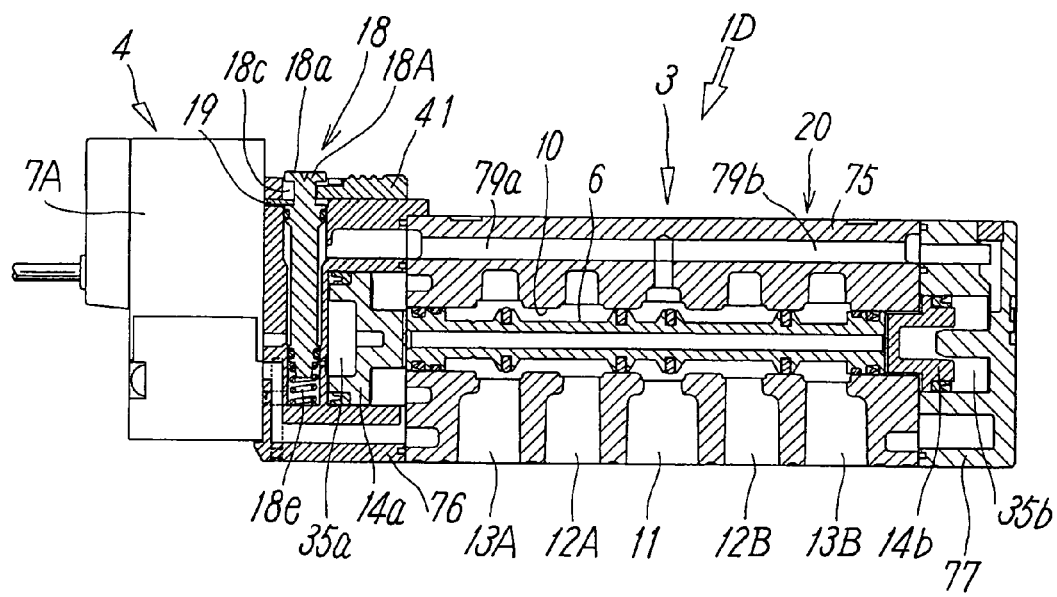
FIG. 18 is a cross-sectional view illustrating a solenoid valve according to a fourth embodiment of the present invention.
Figure 19:
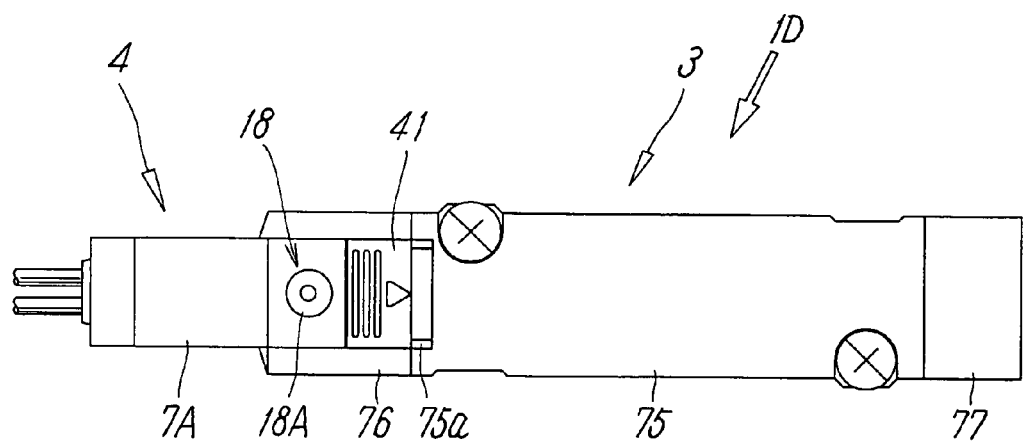
FIG. 19 is a plan view of the article shown in FIG. 18.
Figure 20:
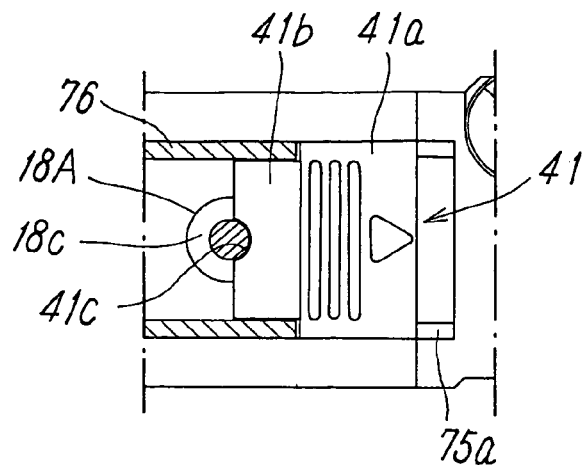
FIG. 20 is a cross-sectional view at the position of the manual operating portion in FIG. 18.

When the pilot valve 7A is turned off, the first pilot pressure chamber 35a is opened to the atmosphere by this pilot valve 7A, so the spool 6 is pressed by the second piton 14b receiving pilot air pressure to be flowed in the second pilot pressure chamber 35b, and the spool 6 moves to the first switching position in FIG. 18. When the pilot valve 7A is turned on, the first pilot pressure chamber 35a communicates with the air opening 11 for supply by this pilot valve 7A, so pilot air flows in this first pilot pressure chamber 35a so as to affect the large-diameter first piston 14a. Consequently, the spool 6 is pressed in the right direction in the drawing by action force due to receptive pressure area difference of both the pistons 14a and 14b, and the spool 6 moves to the second switching position opposite to FIG. 18.

The manual operating portion 18 is formed in the first end block 76, where the manual button 18A for manually switching the spool 6, and the safety member 41 capable of locking this manual button 18A in the operating position are provided.

Figure 21:
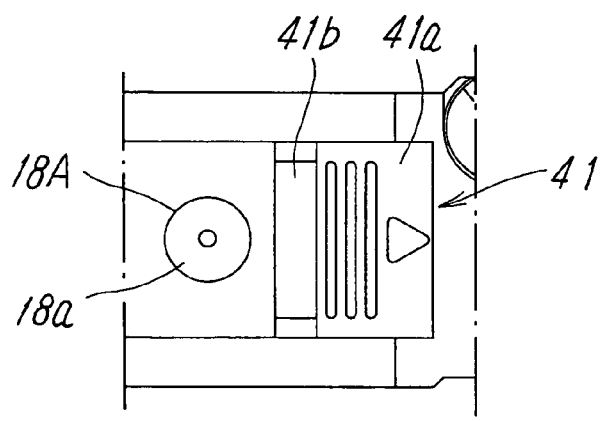
FIG. 21 is a principal component plan view illustrating a state in which the safety member is retreated to an unlocking position in FIG. 19.
Figure 22:
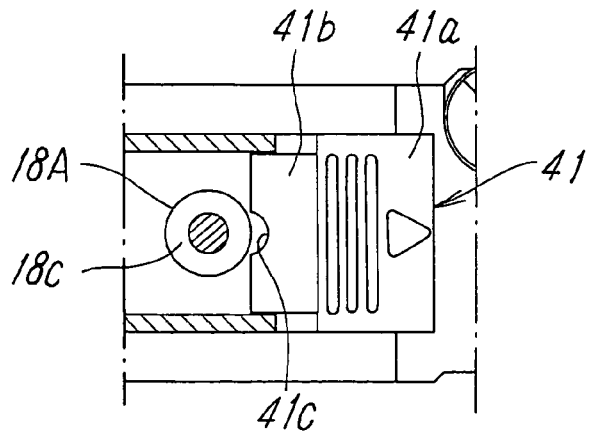
FIG. 22 is a cross-sectional view of the article shown in FIG. 21.

The manual button 18A is the same non-self-retaining type as the respective manual buttons 18A and 18B according to the first embodiment, the inoperative state in FIG. 18 is changed to a state in which the safety member 41 is retreated to the unlocking position in FIG. 21 and FIG. 22 so as to disengage the locking wall 41b from the locking grooves 18c, and then the manual button 18A is depressed to the position where the head portion 18a is locked in the positioning plate 19, thereby directly communicating the first pilot pressure chamber 35a with the air opening 11 for supply so as to move the spool 6 to the second switching position. Also, when the depression thereof is released, the manual button 18A is automatically returned to the inoperative position due to the spring force of the return spring 18e. When this manual button 18A is in the inoperative position in FIG. 18, advancing the safety member 41 to the locking position illustrated in FIG. 18 through FIG. 20 engages the locking wall 41b with the locking grooves 18c so as to lock the manual button 18A in this inoperative position.

The safety member 41 includes the operating head 41a capable of moving along a guide 75a formed in the first end block 76, and the locking wall 41b extending from this head 41a, the recessed portion 41c detachably engaging with the locking grooves 18c of the manual button 18A is formed on the tip of this locking wall 41b. This point is the same as the case of the first embodiment, and the difference as to the first embodiment is in that the manual button 18A is only one, and accordingly, the recessed portion 41c is also only one.

Note that the safety member 41 may be configured so as to be locked in both the locking position and the unlocking position in order to prevent unintentional movement due to vibration or impact or the like. To this end, an arrangement may be made wherein a protrusion and a recess, which are flexibly engaged each other in the aforementioned respective positions, are formed in the safety member 41 and the first end block 76, for example.

With the fourth embodiment, the single-pilot-type solenoid valve has been described, but providing the solenoid operating unit 4 and the manual operating portion 18 including the safety member 41 on the second end block 77 side allows a double-pilot-type solenoid valve including the manual operating portion and the solenoid operating unit on both sides of the main valve unit 3 to be realized.

Also, the aforementioned embodiments have described a 5-port type solenoid valve, but the solenoid valves to which the present invention is applied are not restricted to the 5-port type; rather, a 3-port type for example, may be employed.

The invention claimed is:

1. A solenoid valve with manual buttons comprising:
   a main valve unit building in a spool for switching a channel, and
   a solenoid operating unit for driving said spool;

wherein said main valve unit includes
  manual buttons manually capable of switching said spool, and
  a safety member movably disposed;
wherein the manual buttons are inserted into button attaching holes which are formed in a housing of the main valve unit so as to be depressed in the direction orthogonal to the axial line of the main valve unit from the top face of the housing, and the manual buttons include locking grooves in a part positioned into the button attaching holes; and
wherein the safety member is disposed on the top face of the housing so as to move in the axial direction of the main valve unit, the safety member includes a head for operating and a locking wall, the locking wall extends to the manual buttons from the head and an end thereof enters an inside portion of the housing and engages/disengages with/from the locking grooves of the manual buttons in the inside of the housing, and the safety member is manually capable of moving between a locking position for locking said manual buttons in an inoperable state by locking said safety member in said manual buttons and an unlocking position for unlocking said manual buttons by releasing said safety member from said manual buttons.

2. A solenoid valve according to claim 1, wherein recessed portions are formed on the tip of said locking wall in said safety member, and these recessed portions are configured so as to be fitted/locked in said manual buttons at the position of said locking grooves when said safety member is in said locking position.

3. A solenoid valve according to claim 1, wherein rail-shaped guides extending in the axial direction are formed on the top face of said housing, and said safety member is disposed so as to move along these guides.

4. A solenoid valve according to claim 2, wherein rail-shaped guides extending in the axial direction are formed on the top face of said housing, and said safety member is disposed so as to move along these guides.

5. A solenoid valve according to claim 1, wherein said manual buttons are self-retaining-type manual buttons which can be retained in an operating position, and are configured so as to restrict said safety member from moving to the locking position when these manual buttons are self-retained in the operating position.

6. A solenoid valve according to claim 2, wherein said manual buttons are self-retaining-type manual buttons which can be retained in an operating position, and are configured so as to restrict said safety member from moving to the locking position when these manual buttons are self-retained in the operating position.

7. A solenoid valve according to claim 3, wherein said manual buttons are self-retaining-type manual buttons which can be retained in an operating position, and are configured so as to restrict said safety member from moving to the locking position when these manual buttons are self-retained in the operating position.

8. A solenoid valve according to claim 4, wherein said manual buttons are self-retaining-type manual buttons which can be retained in an operating position, and are configured so as to restrict said safety member from moving to the locking position when these manual buttons are self-retained in the operating position.

9. A solenoid valve according to claim 1, further comprising a fixing member for fixing said safety member to said locking position.

10. A solenoid valve according to claim 9, wherein said fixing member is movably disposed on a position adjacent to said safety member, and is capable of moving between a fixing position for fixing said safety member to said locking position by coming into contact with this safety member disposed on said locking position and an unlocking position for separating from said safety member.

11. A solenoid valve according to claim 9, wherein recessed portions are formed on the tip of said locking wall in said safety member, and these recessed portions are configured so as to be fitted/locked in said manual buttons at the position of said locking grooves when said safety member is in said locking position.

12. A solenoid valve according to claim 10, wherein recessed portions are formed on the tip of said locking wall in said safety member, and these recessed portions are configured so as to be fitted/locked in said manual buttons at the position of said locking grooves when said safety member is in said locking position.

13. A solenoid valve according to claim 10, wherein rail-shaped guides extending in the axial direction are formed on the top face of said housing, and said safety member is disposed so as to move along these guides.

* * * * *